United States Patent [19]

Manico et al.

[11] Patent Number: 4,933,709
[45] Date of Patent: Jun. 12, 1990

[54] ADJUSTING PHOTOGRAPHIC PRINTER COLOR EXPOSURE DETERMINATION ALGORITHMS

[75] Inventors: Joseph A. Manico; Robert Goodwin, both of Rochester, N.Y.

[73] Assignee: Eastman Kodak Company, Rochester, N.Y.

[21] Appl. No.: 412,066

[22] Filed: Sep. 25, 1989

[51] Int. Cl.$^5$ ............................................. G03B 27/80
[52] U.S. Cl. ...................................... 355/38; 355/77; 355/68
[58] Field of Search .............................. 355/38, 68, 77

[56] References Cited

U.S. PATENT DOCUMENTS

| 4,154,523 | 5/1979 | Rising et al. | 355/38 |
| 4,159,174 | 6/1979 | Rising et al. | 355/38 |
| 4,168,120 | 9/1979 | Freier et al. | 355/38 |

Primary Examiner—L. T. Hix
Assistant Examiner—D. Rutledge
Attorney, Agent, or Firm—Raymond L. Owens

[57] ABSTRACT

A method is taught for automatically adjusting the balance coefficients of printer exposure determination algorithms based on an examination of the corrections made by the operator when reprinting negatives from unsatisfactory prints. The adjustment is based on the average correction and the standard deviation of the corrections made to each balance coefficient of the exposure determination equation.

2 Claims, 1 Drawing Sheet

ADJUSTING PHOTOGRAPHIC PRINTER COLOR EXPOSURE DETERMINATION ALGORITHMS

TECHNICAL FIELD OF THE INVENTION

This invention relates to methods for controlling the exposure amount of negatives in a photographic printer by automatic adjusting the color exposure determination algorithm using information obtained from incorrectly exposed prints (make-overs).

BACKGROUND OF THE INVENTION

In the photographic printing art, it is necessary to make-over prints that were classified and exposed incorrectly. A color exposure determination algorithm computes red, green, and blue exposures for each print.

A percentage of negatives made by the above algorithm will be incorrectly classified. Seasonal and regional variations can significantly contribute to an increase in incorrect negative classifications. These variations can include, for example, a higher concentration of "Sky/Water" scenes from coastal areas and "Sun/Snow" scenes during winter months. In any event, an operator must perform a subjective classification before making a reprint.

SUMMARY OF THE INVENTION

The object of this invention is to automatically adjust (enhance) the printer color exposure determination algorithm in order to increase the ratio of acceptable prints with no disruption of the normal work flow.

According to this invention, negatives that fail to produce acceptable prints will be re-scanned and stored during the make-over operation. More particularly, in accordance with this invention, a method of controlling the exposure of negatives in a photographic printer, comprises the steps of:

(a) scanning each negative to provide red, green, and blue density information;

(b) producing prints of such negatives employing such density information in a color exposure determining algorithm having at least two neutral density equations with balance coefficients and two chromaticity equations with balance coefficients;

(c) determining and computing balance coefficient correction data for those prints that are unacceptable, and whose negatives are rescanned and are to be reprinted;

(d) computing a statistic, based on each balance coefficient average error of that balance coefficient, and the standard deviation of such error; and (e) automatically adjusting each balance coefficient of such equations in accordance with its average error if its computed statistic exceeds a predetermined threshold value.

This technique is useful to compensate for regional and seasonal film population variations.

DETAILED DESCRIPTION OF THE PREFERRED EMBODIMENT

Figure 1:
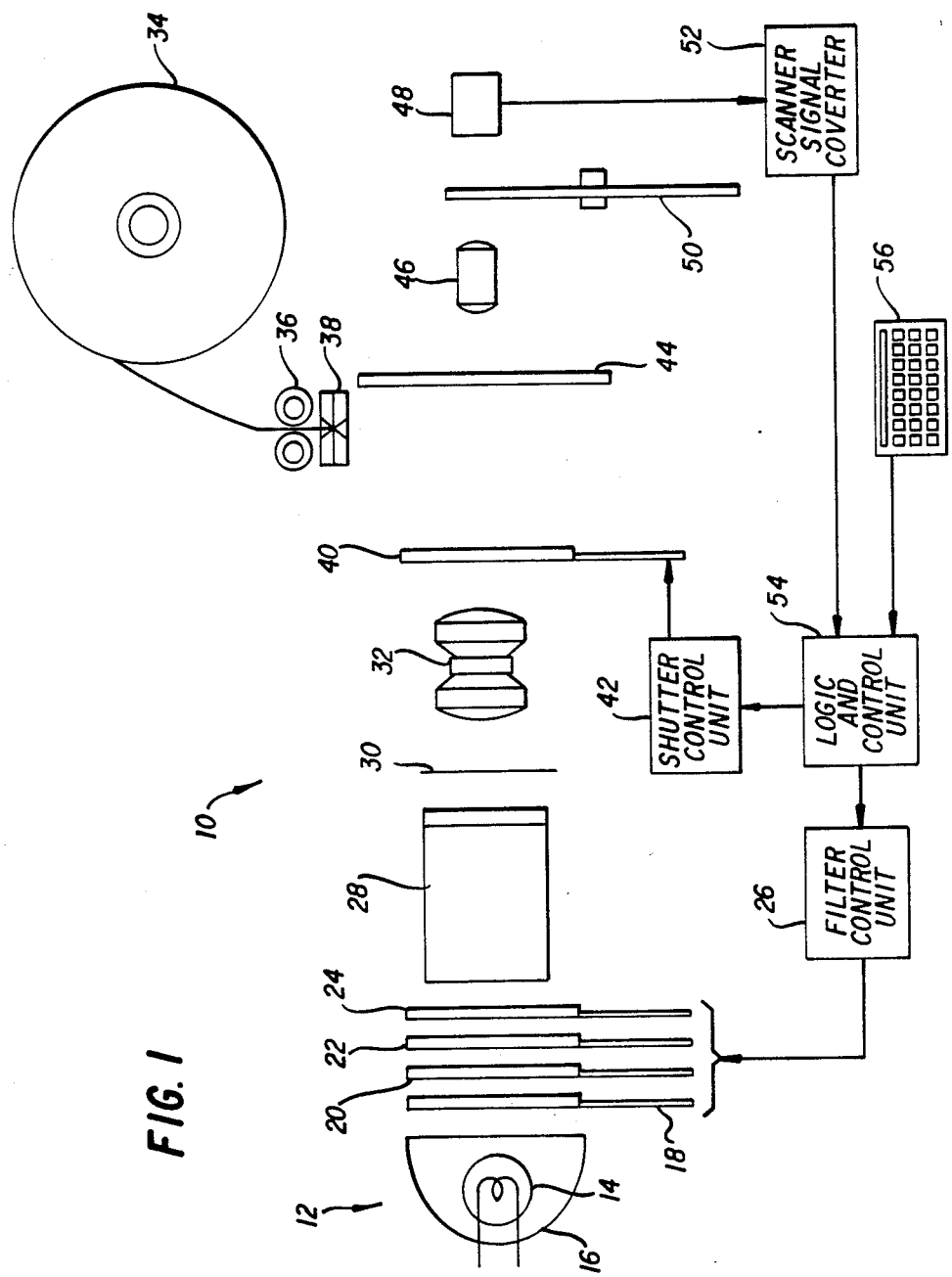
FIG. 1 is a schematic illustrating an embodiment of the photographic printing apparatus in accordance with the present invention.

Referring to FIG. 1 there is shown a schematic of a photographic printer 10. The printer includes a light source 12. Source 12 includes a lamp 14 and a reflector 16. The lamp can conveniently be provided by a tungsten lamp.

Light from lamp 14 passes through a balancing filter 18 and selectively through cyan (C) 20, magenta (M) 22, and yellow (Y) 24 cutoff filters. The position and control of these filters is provided by a conventional filter control unit 26. The operation of these filters is conventional and so will only be briefly described.

The cyan, magenta and yellow cutoff filters are used to independently control the red, green, and blue exposure. The printing lamp 14 produces white light and as the cutoff filers enter the beam, the red, green and blue components of the light are blocked or "cutoff" from the photographic paper.

An integrator and diffuser 28 shown as a single unit, concentrates and diffuses light which has passed through the filters so as to provide a uniform intensity of light over a predetermined area on a photographic negative 30. Light which has illuminated the negative 30 is collected by a printing lens 32 which focuses such light onto the photographic paper disposed at a paper plane 44. The photographic paper is delivered from roll 34 by paper drive rollers 36. After exposure, the exposed paper is severed by a paper cutter 38. The exposed paper is then delivered to a development station. Before the paper is cut, the exposure is terminated by a shutter 40 which is moved by a conventional shutter control 42 to a position where it blocks light from the negative 30. The shutter 40 can, as well understood in the art, be located at a different position along the optical path.

Thereafter, a new negative 30 is introduced into the light path by means not shown. The shutter 40 is opened and the light from the lens 32 is projected onto a Fresnel lens 44 which is also located at approximately the paper plane.

An image of the negative is formed on the Fresnel lens 44. This image is the subject for the scanner lens 46 which projects it onto photodiode 48. A scan disk 50 is driven at a constant rate and has a plurality of apertures and filters. Each disk aperture is provided with red, green, or blue filters. As the disk is rotated and each aperture passes into the light path, a color matrix of density points from the negative is projected onto the surface of the photodiode 48. These individual points are converted by the photodiode 48 to a series of voltages which are provided to the scanner signal converter 52. The converter 52 will be understood to include an appropriate amplifier circuit. Amplified signals are then converted by an analog to digital converter to digital signals, each with a numeric value corresponding to red, green or blue density components of a pixel of the negative. These values are provided to a logic and control unit 54 which includes memory and a microprocessor having a color exposure determining algorithm embodied in a program. These digital numbers are, of course, in log space as will be well understood to those skilled in the art. $E_R$, $E_G$ and $E_B$ are used by the logic and control unit to cause the shutter control unit 42 to adjust the shutter 40 to control the amount of exposure. Also the program causes the filter control unit 26 to adjust the individual red, green and blue exposures by positioning the cutoff filters 20, 22 and 24. For example, an over exposed (dark) negative would require a longer than normal overall exposure controlled by the shutter 40 and film and scene characteristics would be compensated for by the individual red, green and blue exposures produced by the cutoff filters 20, 22 and 24.

One such algorithm is illustrated in Tables 1, 2, and 3. The red, green, and blue digital components of a pixel are substituted into the three equations shown in Table 1. Commonly assigned U.S. Pat. No. 4,159,174 discusses color determination in detail and its disclosure is incorporated by reference therein. See column 9 of such patent for example. Neutral (N), Green-magenta chromaticity (G,M) and Illuminant-chromaticity ILL coordinates are computed for each pixel from its red, green, and blue components. Thereafter Neutral exposure ($E_N$), Green-magenta ($E_{G,M}$) and Illuminant exposure ($E_{ILL}$) are computed for the negative.

TABLE 1

$$\begin{vmatrix} N \\ G,M \\ ILL \end{vmatrix} = \begin{vmatrix} 1/\sqrt{3} & 1/\sqrt{3} & 1/\sqrt{3} \\ -1/\sqrt{6} & 2/6 & -1/\sqrt{6} \\ -1/\sqrt{2} & 0 & 1/\sqrt{2} \end{vmatrix} * \begin{vmatrix} R \\ G \\ B \end{vmatrix}$$

TABLE 2

$$\begin{vmatrix} E_R \\ E_G \\ E_B \end{vmatrix} = \begin{vmatrix} 1/\sqrt{3} & -1/\sqrt{6} & -1/\sqrt{2} \\ 1/\sqrt{3} & 2/\sqrt{6} & 0 \\ -1/\sqrt{3} & -1/\sqrt{6} & 1/\sqrt{2} \end{vmatrix} * \begin{vmatrix} E_N \\ E_{G,M} \\ E_{ILL} \end{vmatrix}$$

TABLE 3

Neutral Density Calculation ($E_N$)

If (Nmax - N5%) is less than 1.8 then the negative is low contrast and equation (1) is used:
(1) En = Bal-Low + .33*Nave + .30*Nmax + .35*Nmin
  otherwise the negative is high contrast and
equation (2) is used.
(2) En = Bal-Hi + 0.30*Nave + .35*Nmax + .29*Nmin
where

| | |
|---|---|
| En | calculated Neutral log Exposure |
| Nave | average of the Neutral density pixels for a negative |
| Nmax | maximum Neutral density pixel of a negative |
| Nmin | Minimum Neutral density pixel of a negative |
| N5% | the Neutral density below which 5 percent of the individual (N) neutral density pixels of a negative fall |
| Bal-Low | density balance coefficient for the low contrast negatives of equation (1) |
| Bal-Hi | density balance coefficient for the high contrast negatives of equation (2) |

Color Chromaticity Calculations ($E_{G,M}$ and $E_{ILL}$)

(3) SAT = (G,Mave - G,Mctr)2 + (ILLave - ILLctr)2
  WGT = 1.0 - 40*SAT
  If WGT less than WGTmin then WGT = WGTmin
(4) $E_{G,M}$ = Bal-gm + 0.90*WGT*(G,Mave - G,Mctr)
(5) EIll = Bal-ill + 0.96*WGT*(ILLave - ILLctr)
where

| | |
|---|---|
| $E_{G,M}$ | calculated Green-magenta log Exposure |
| EIll | calculated Illuminant log Exposure |
| G,Mave | average of the Green-magenta density pixels for a negative |
| G,Mctr | Population Average** of the Green-magenta component of the densities |
| ILLave | average of the Illuminant density pixels for a negative |
| ILLctr | Population Average** of the Illuminant component of the densities |
| WGTmin | minimum value (determined experimentally) for de-weighting function (ex. 0.2) |
| Bal-G,M | G,M balance coefficient of equation (4) |

TABLE 3-continued

| | |
|---|---|
| Bal Ill | ILL balance coefficient of equation (5) |

**The term Population Average refers to the average density from many negatives (such as 1000 or more) of the same film type.

A number of quantities averages are computed in the logic and control unit 54 for each of the numbers computed from Table 1.

Turning now to Table 3, $E_N$ is computed using either equations (1) or (2). It is to be noted the Bal-Low and Bal-Hi balance coefficients may be adjusted in accordance with this invention on the basis of negatives which are to be reprinted.

After $E_N$, $E_{G,M}$, and $E_{ILL}$ are computed for a negative, these values are substituted into the equations of Table 2 and the exposures for red ($E_R$), green ($E_G$), and blue ($E_B$) are computed.

After a series of prints are made an operator evaluates the prints. In other words, the operator performs a quantitative subjective evaluation in terms of color and density.

The operator now makes a decision as to whether the prints are acceptable or if they need to be made over. If the prints are unacceptable, they are marked with the appropriate color density correction information. Corresponding negatives are now reloaded into the printer.

Briefly returning to FIG. 1, the operator by means of a keyboard 56 signals the logic and control unit 54 to operate in a make-over mode. The negative is re-scanned and the matrix information is entered into the memory of the logic and control unit 54. Correction information is entered via keyboard 56. The exposure values are computed and then they are corrected by the operator correction information.

The negative is now caused to be reprinted with the operator determined corrections producing acceptable prints, and the data used to remake prints is cataloged and stored in memory in the logic and control unit 54.

A running balance average is generated for each exposure error component (i.e. the Neutral, the Green-magenta, and the Illuminant). In case there is more than one equation for the component of interest (as with the Neutral algorithm in Table 3A) then a separate running average is kept for the balance errors made by each equation. As the error history is accumulated, a standard statistic is computed for each equation balance coefficient (1), (2), (4) and (5) after each new negative is reprinted to determine if the average error generated by each equation is zero or not. This "t" test may be done by generating the following statistic for each error component, $$t = \sqrt{n} * AVEerror/STD\ DEVerror$$

where
  n the number of individual exposure errors comprising the current average
  AVEerror the current average error generated for the equation of interest
  STD DEVerror the standard deviation of such error generated by the equation of interest As is well known by those skilled at statistical testing, if n exceeds 60 then t will be very nearly distributed with a Normal distribution.

It can be shown mathematically that the total magnitude of the squared error will be minimum if the average error is 0. Thus in order to minimize the effects of exposure errors introduced by any component of the algorithm, it is desirable to make adjustments to the algorithm balance coefficients so that the average error for that equation is as near zero as possible.

Thus once each equation's error history passes 60 entries, t is compared to a predefined threshold value (determined experimentally), such as 1.96 or 2.0 at each update. If the value for t exceeds the threshold, then the balance coefficient is adjusted up or down by the average error. If the value for t does not exceed the threshold, the accumulation of the error history continues until it does exceed it. In order to reduce the effects of possible oscillations in the balance adjustment, only a fraction of the average error, such as ½ the average error, may be used for the correction each time. In any case after each correction is applied, n is set back to 0 and a new error history is begun for that exposure equation.

This procedure permits the algorithm to automatically track seasonal changes in the population of scene types being printed. For instance, in the Summer the high contrast negative balance will be lowered to adjust to the greater number of outdoor backlighted scenes. In the Winter it will be increased to adjust for the greater number of high contrast flash scenes. The procedure is done by making use of the corrections that the operator makes in production printing, and requires no additional operator cost or time.

The invention has been described in detail with particular reference to a preferred embodiment thereof, but it will be understood that variations and modifications can be effected within the spirit and scope of the invention.

We claim:

1. A method of controlling the exposure of negatives in a photographic printer, comprises the steps of:
    (a) scanning each negative to provide red, green, and blue density information;
    (b) producing prints of such negatives employing such density information in a color exposure determining algorithm having at least two neutral density equations with balance coefficients and two chromaticity equations with balance coefficients;
    (c) determining and computing balance coefficient correction data for those prints that are unacceptable, and whose negatives are rescanned and are to be reprinted;
    (d) computing the average error for each balance coefficient, computing the standard deviation of the average error of each balance coefficient, and computing a statistic for each balance coefficient based on its average error and its standard deviation of the error; and
    (e) automatically adjusting each balance coefficient of such equations in accordance with its average error if its computed statistic exceeds a predetermined threshold value.

2. The method of claim 1 wherein a t test is used to compute the statistic.

* * * * *